Aug. 8, 1939.   H. BAILLARD ET AL   2,168,757
CABLE PLUG IN SLEEVES
Filed Oct. 16, 1935

INVENTORS: H. BAILLARD
V. B. PIKE
BY J. W. Schmied
ATTORNEY

Patented Aug. 8, 1939

2,168,757

UNITED STATES PATENT OFFICE 2,168,757

CABLE PLUG IN SLEEVES

Hamilton Baillard, New York, N. Y., and Vernon B. Pike, Morristown, N. J., assignors to Bell Telephone Laboratories, Incorporated, New York, N. Y., a corporation of New York Application October 16, 1935, Serial No. 45,192

11 Claims. (Cl. 174—23)

This invention relates to methods and means of sectionalizing multiple conductor communication or similar cables comprising a plurality of insulated conductors covered with a gas-tight sheath.

More particularly, the invention relates to a cable plug including a cable sleeve. The manufacture and use of cable plugs is an old art.

During the last decade, there has developed in the communication art a method of cable maintenance which has involved the maintenance of gas pressures of from nine to fifteen pounds per square inch within the cable sheath. Nine pounds is an acceptable pressure. For testing purposes it may be necessary to maintain gas pressure in the section of cable being tested for a few hours, a few days, or a few weeks. Cable plugs permitting the maintenance of gas pressure in a cable for a few hours are not particularly difficult to manufacture and utilize as the leakage will be slow and the gas may be replenished from an external supply if necessary. For maintaining the gas pressure for periods of a few days or a few weeks, the technical difficulties are increased and to maintain pressures for years they are still more increased. In so far as cable plugs of the type herein described may be useful for maintaining cables under gas pressure for a limited length of time it will be understood that they may be employed for this purpose. Primarily, however, the invention deals with cable plugs of a type adapted to maintain sections of cable under pressure for indefinitely extended periods of months or years. Cables which are separated into sections by suitable plugs and have gas at nine pounds per square inch contained in these sections are protected against the entrance of moisture into the sheath which might cause a deterioration in the efficiency of the transmission circuits of the cable. By the addition of suitable gas pressure actuated devices, mounted and controlled by the gas pressure at various points along each section length and connected by conductors of the cable to indicating devices at a central maintenance office, any perforation or defect in the sheath which will permit the gas to escape and which might subsequently admit moisture into the cable, is detected before the gas is exhausted from the cable section. A primary factor increasing the difficulty of producing and maintaining gas-tight cable plugs is the temperature variation which causes contraction and expansion both laterally and circumferentially of the sheath and of the conductors contained therein. The variation of temperature in a single season may cover a range of from 50° to 60° F. and the extreme annual variations in temperature of cable carried on pole lines may be as much as 150° F., but considerably less in the case of cable buried in conduit.

Upon first and casual consideration of the matter, one might suppose that one or more methods of plugging cables previously proposed would be effective to maintain gas pressure in cables for indefinite periods of time but experience has demonstrated that such devices do not meet all the requirements. As a first requirement, it is extremely desirable, although perhaps not absolutely essential, that cable plugs be of a type which can be installed in the field in existing cables rather than factory produced plugs in the form of a short plugged section of cable which is carried to the point of use and spliced into the cable in place of an existing length. Among other things, the interruptions of service which would result from cutting out a section of the cable and splicing in a cable plug would oftentimes be very undesirable. It must be considered in this connection that communication cables in use contain as high as eighteen hundred pairs of conductors. Toll cables, in connection with which cable plugs are more widely utilized, do not ordinarily contain so large a number of pairs of conductors but the continued availability for use of the circuits in which they are included is of greater economic value than in the so-called "exchange" cables used in local areas.

Other requirements for cable plugs are that they involve the utilization of materials readily obtainable at a reasonable price and the degree of skill required in installation be not beyond that of a high-grade cable splicer. It is required that they be installable under practically all conditions of weather and temperature and oftentimes in a constricted space, such as a manhole. A primary requirement, of course, is that the plug remain gas-tight for an indefinite period of time. The meeting of this requirement has been a source of great difficulty and has necessitated years of research and testing.

Researches carried on have demonstrated that there are two distinct kinds of leakage paths which must be sealed to produce a gas-tight plug. These leakage paths are, first the space between the individual conductors and the insulating paper, and second, the spaces between the insulated conductors and those between the core and the cable sheath or cable sleeve.

The patent to Baldwin, No. 1,762,255, granted June 10, 1930, discloses certain features which have been found useful in the construction of successful plugs. A particular feature thus disclosed is that of removing the sheath from a portion of the cable core and connecting around the removed portion a gas-tight sleeve having a body portion of a diameter larger than the diameter of the cable proper. This sleeve is provided with openings and filled sufficiently full of molten wax to create considerable pressure inside the sleeve, after which the wax is allowed to cool and the sleeve is sealed. It will be noted that the Baldwin patent, in fact, discloses two sleeves utilized according to a special technique described therein.

The present invention may be considered an improvement upon the disclosure of the Baldwin patent to the extent that it makes use of cable sleeves and there will be described herein such features of improvement as have been found to produce the best cable plugs; the appended claims will be directed to such features of improvement as are believed to have originated with the inventors hereof.

In the accompanying drawing.

Figure 1:
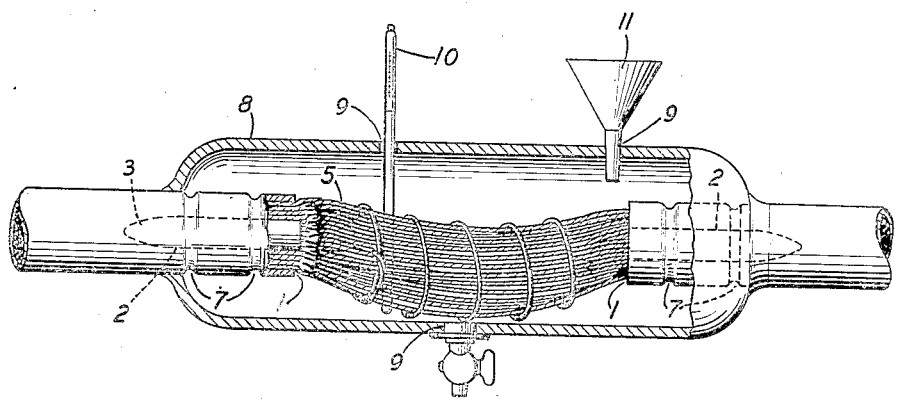
Fig. 1 illustrates diagrammatically a preferred form of cable plug.

By reference to the drawing, the method of producing cable plugs will now be described. The cable should be opened up by carefully removing a length of the sheath ranging from about nine inches, in the case of small cables, up to thirteen inches, in the case of large cables. The paper wrapping about the core of conductors is then removed and the conductors "ballooned". "Ballooning" is the term employed by those skilled in the art in reference to the separation of each conductor from its neighbors so that as much free space as possible exists between them. After "ballooning", the butt ends of the sheath are closer together than originally by about one inch, in the case of small cables, ranging up to about two or more inches, in the case of large cables. It is acceptable practice then to mark the sheath so that these exact dimensions of separation may be maintained when the plug is completed. At this stage the cable should be open to the atmosphere on both sides of the point at which the plug is to be made and the gas pressure on each side reduced to, and maintained at, atmospheric pressure. If an adjacent section of the cable is necessarily under pressure during the operation, an opening may be drilled into the sheath a slight distance from the place where the plug is proposed to be located to relieve the pressure during the operation and then when the plug is completed, this opening may be plugged and sealed.

Figure 2:
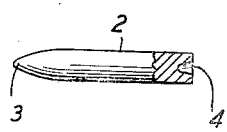
Fig. 2 illustrates a wooden core center pin, the use of which constitutes one of the features of novelty of the invention.
Figure 3:
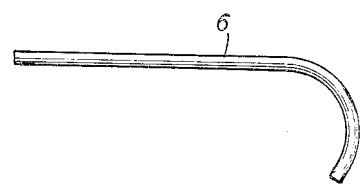
Fig. 3 illustrates a ring-forming tool, which has been found to be useful in beating grooves into the cable sheath, and Fig. 4 a partly sectional view of a completed plug.

A wooden plug 2, such as shown in Fig. 2, having a smoothly rounded point 3 and a recess 4 in the butt end is next utilized. This plug may consist of a hard, close-grain wood, such as beech, birch, or maple, although obviously other substances may be used. The plug is boiled for a time in cerese wax or any suitable similar material and after cooling is coated thoroughly with a lubricant, such as petroleum jelly. The plugs 2 are then inserted into the approximate center of the cable conductors, as indicated in Fig. 1, and driven home, if necessary, by inserting the tip of another plug in the recess 4 in order to drive the plug down until it is approximately even with the sheath edge. This operation is repeated upon each butt end of the cable.

Figure 4:
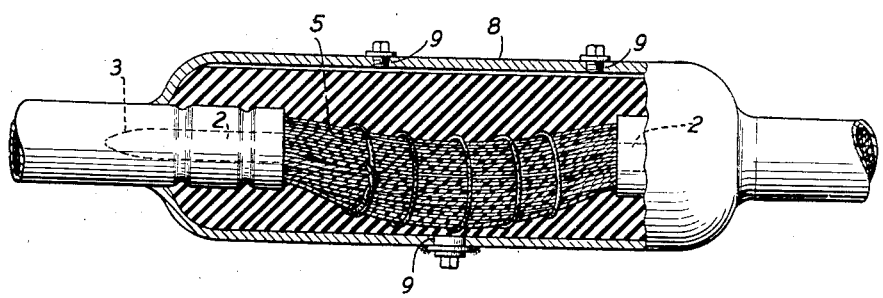

After the insertion of the wooden core pins the wires are spaced as evenly as possible and are shaped so that all have a dip downwards toward the mid-cross section of the plug. This is shown in Figs. 1 and 4.

A few turns of coarse cotton cord 5 are then wrapped around the ballooned conductors to protect them from direct contact with the lead sleeve which subsequently will be placed around them. The pins 2 may be suitably selected as to diameter in proportion to the size of the cable.

The next step is to beat into the cable sheath by means of a tool 6 a plurality of rings 7. Tool 6 may be made of cold rolled steel rod about one-half inch in diameter having its end uniformly curved through an arc of about 120 degrees. The depth of the rings 7 will vary according to the size of the cable from a small depth in the case of small cables up to a substantial fraction of an inch in the case of large cables. The rings should be of uniform depth around the circumference of the cable. A cable sleeve 8 of suitable dimensions is then selected and prepared by drilling three holes 9 in the positions indicated. In the hole which will be the bottom hole is soldered a pressure testing flange or other suitable fitting which may be used to render the hole air-tight by plugging or otherwise after the plug is completed. The sleeve is then attached to the cable sheath by the process known as "wiping", during which the separation of the butt ends 1 is maintained by observing the marks previously described. After the sleeve is firmly and properly attached a suitable thermometer 10 is placed in one of the upper openings 9 and a suitable funnel 11 in the other opening.

A kettle of "cerese" wax (proprietary name—this is a high melting point paraffin) is now heated to about 350° F., or higher in cold weather, and several quarts are poured into the funnel and allowed to drain out through the bottom flange 9. This flange is provided with a valve which is left open. A suitable wax was found to be one which melts at about 170° F. After the wax is draining freely from the bottom of the opening, the opening is partly closed by means of a valve or otherwise and adjusted so that a thin stream of wax flows out. Pouring is continued until the sleeve is filled and the thermometer reads about 265° F., and then continued for at least fifteen minutes and preferably longer. The bottom opening is then closed and the sleeve kept full of wax by further additions, if necessary, until the temperature falls to 200° F. The bottom opening is then opened and the sleeve drained completely. The thermometer is then removed and the drainage opening sealed or closed permanently in any suitable manner.

Extended investigations of various waxes over a long period of time have shown that one of the essential properties required is that the wax have the property of rapidly and effectively penetrating the paper insulation and filling the space therebetween and the conductor. Beeswax and ordinary paraffin originally employed possess the required properties to a degree but are less effective.

Researches have indicated that a frequent cause of failure in cable-plugs has been the inability to seal up the longitudinal air passages between the individual conductors and their surrounding paper insulation. It is believed that the impregnation process just described contributes to the sealing of these air passages by filling them with wax. The dip formed in the conductors tends to keep the wax in these minute sections when the sleeve is filled later with heated asphalt.

A kettle of asphalt is now ready and is heated to about 230° F. For this purpose, there is preferred a soft grade of asphalt which possesses some degree of fluidity or cold flow at all natural temperatures to which cable plugs are likely to be exposed. Asphalt has no definite melting point but becomes quite liquid when the temperature is raised considerably above that at which the material becomes noticeably soft. The asphalt is heated very evenly to about 230° F. and after the wax-impregnated sleeve has cooled for about fifteen minutes, the asphalt is poured into the funnel until it flows out of the other open hole in the top of the sleeve. Following this, the pouring is continued for ten or fifteen minutes during which the sleeve is tapped a few sharp blows with a suitable tool to facilitate the removal of any entrapped air which can thus be removed. The pouring is then continued until the flow from the funnel into the sleeve has practically ceased, after which time the funnel is removed and suitable flanges or fittings are soldered into the upper holes 9. After the sleeve and contents have cooled sufficiently, the openings in the fittings are sealed by means of pipe plugs or other suitable means.

An important feature of this construction is the air space above the asphalt in the sleeve. This air space is achieved by filling the sleeve with hot asphalt and permitting it to contract naturally as it cools. None is added after the pouring has once been stopped. The flanges are soldered on and plugs sealed in tight leaving a void at the top inside of the sleeve. It has been found that gas will find its way to this void when a plug is put under pressure and once there it is trapped for the life of the plug. This pressure is transmitted undiminished to all parts inside of the sleeve. We, therefore, have the fluid asphalt opposing with approximately equal pressure the force of any gas tending to form a channel through any part of the plug. Likewise this air space provides a cushion which safeguards the lead sleeve against injury from excessive pressure when the asphalt expands on warm days. Care must be exercised in order that no conductor wires extend through the surface of the asphalt into this void as conductors so exposed might provide a leakage path.

It has been found by extended observation and testing that cable plugs made according to the procedure described will remain gas-tight for long periods of time with very few failures. All the phenomena involved are perhaps not entirely understood but it is believed that one of the principal factors in the success of these plugs is that the wax seals the air passages between each conductor and its surrounding layer of paper and that the asphalt or similar equivalent material seals the passages between the individual insulated conductors, and between the conductors as a whole and the sheath. Further, the asphalt adheres strongly to the lead sleeve wall and remains plastic throughout range of temperatures, ordinarily encountered; also its tendency to "cold-flow" permits it to readjust its level after bubbles are blown in and through the body of asphalt when the cable system is placed under gas pressure; adjustment to temperature changes also facilitated. This is in contrast to behavior of waxes as a class, which tend to become brittle and break away from the sleeve.

What is claimed is:

1. A cable plug for a cable consisting of a plurality of separately insulated conductors covered with a gas-tight sheath, which comprises a sleeve having a body portion of a diameter exceeding the diameter of the cable sheath sealed onto the cable sheath at the plugging point, a solid member centrally located among the conductors at the end of the sheath within the sleeve, constricted portions in the sheath over the solid member, and a filling of thermoplastic material within said sleeve.

2. The method of making a plug for a length of gas-filled cable consisting of a plurality of highly compacted insulated conductors having a gas-tight sheath which comprises in the order named forcibly inserting a solid pin among the conductors in the end of said cable length to be sealed to compress said conductors against said sheath, sealing a gas-tight sleeve thereover, and filling said sleeve with plastic material.

3. The combination in a cable plug of a plurality of individually insulated conductors, a sheath surrounding said conductors, a portion of said sheath being removed, a solid member centrally inserted among said conductors at the butt end of said sheath, and a circumferential constriction in said sheath whereby said conductors are compressed between said constricted portion and said member.

4. In the method of making a cable plug, the steps which include removing a portion of the cable sheath, intermediate the ends of said sheath, ballooning the conductors, applying a cable sleeve over the ballooned conductors, filling and allowing to drain from the bottom of said sleeve a molten waxy substance which is solid at ordinary atmospheric temperatures, and subsequently filling said sleeve with material plastic at ordinary temperatures.

5. In the method of making a cable plug, the steps which include removing a portion of the cable sheath, wiping a cable sleeve around the conductors at the removed portion to make an air-tight seal, flowing molten wax through said sleeve to saturate the insulation of the conductors contained therein, draining said sleeve, filling said sleeve with a thermoplastic substance which remains somewhat fluid at normal atmospheric temperatures, and sealing the sleeve.

6. A cable plug for a multi-conductor cable with conductors insulated with fibrous material comprising a sleeve of a diameter large compared to the cable sheath, an interior space from which a portion of the cable sheath has been removed, a pin driven into the cable sheath end formed by the removed portion, a constriction ring beaten into the cable sheath over said pin, wax impregnating the insulation of the conductors within said sleeve, a filling of thermoplastic substance substantially filling the remaining space within said sleeve above the highest part of any portion of any conductor therein, and air-tight fittings sealing the opening of said sleeve.

7. A method of making a cable plug which comprises removing a portion of a cable sheath, ballooning the conductors from said removed portion, driving pins into the central portions of the ends formed by the removal of the sheath, loosely wrapping the ballooned conductors with coarse string, beating one or more constriction rings into the cable sheath of each pin, sealing the cable sleeve over said ballooned conductors and constriction rings, maintaining molten wax within said sleeve for at least five minutes, draining off said wax, filling said sleeve with thermoplastic material, and sealing said sleeve.

8. In a gas-tight termination for a length of communication cable containing gas under pressure, a cable plug comprising a large number of fibrously insulated conductors covered with a gas-tight sheath, a pin forcibly inserted among the conductors and a constricted region in the cable adjacent the pin reducing the diameter of the cable sheath immediately around said pin.

9. A termination for a cable filled with gas and having a gas-tight sheath and a large number of conductors individually insulated, comprising a pin driven into the cable in the direction of the longitudinal axis, annular constrictions beaten into the cable at right angles to said axis, over the pin, the gas-tight sheath covering the pin and a filling of thermoplastic material within said sheath.

10. The method of making a gas pressure plug for a length of gas-filled cable consisting of a plurality of insulated conductors having a gas-tight sheath which comprises, in the order named, forcibly inserting a solid pin into the end of said cable length to be sealed to compress said conductors against said sheath, tightly compressing a section of the end of said sheath about said pin and conductors, wiping a gas-tight chamber to said sheath to enclose said compressed conductors and said pin, sealing the interstices between the individual conductors and their respective insulation coverings with a wax material to prevent the leakage of gas through said interstices, filling the space around said conductors within said chamber with an asphalt material in such manner as to seal the interstices between said conductors and to form a gas pressure trap between said asphalt material and said chamber to prevent the loss of gas pressure within said sealed cable length.

11. The combination in a cable plug of a plurality of individually insulated conductors, a sheath surrounding said conductors, a portion of said sheath being removed, a solid member centrally and forcibly inserted among said conductors to compress said conductors against said sheath, a circumferential constriction in said remaining sheath whereby said conductors are compressed between said constricted portion and said member, a first thermoplastic material sealing the interstices between said conductors and their individual insulation and asphalt material sealing the remaining unsealed spaces.

HAMILTON BAILLARD.
VERNON B. PIKE.